(12) United States Patent
Weber

(10) Patent No.: US 7,595,871 B2
(45) Date of Patent: Sep. 29, 2009

(54) FLOW CELL CONSISTING OF LAYER AND CONNECTION MEANS

(75) Inventor: Lutz Weber, Zweibrücken (DE)

(73) Assignee: thinXXS Microtechnology AG, Zweibrücken (DE)

( * ) Notice: Subject to any disclaimer, the term of this patent is extended or adjusted under 35 U.S.C. 154(b) by 106 days.

(21) Appl. No.: 10/567,933

(22) PCT Filed: Aug. 4, 2004

(86) PCT No.: PCT/EP2004/008700

§ 371 (c)(1),
(2), (4) Date: Feb. 10, 2006

(87) PCT Pub. No.: WO2005/016529

PCT Pub. Date: Feb. 24, 2005

(65) Prior Publication Data

US 2006/0215155 A1    Sep. 28, 2006

(30) Foreign Application Priority Data

Aug. 11, 2003    (DE) ............................... 103 36 849

(51) Int. Cl.
*G01N 1/10*    (2006.01)
(52) U.S. Cl. ............................................... 356/246
(58) Field of Classification Search ......... 356/244–246
See application file for complete search history.

(56) References Cited

U.S. PATENT DOCUMENTS

| 4,798,706 A | 1/1989 | Brigati |
| 5,376,252 A | 12/1994 | Ekström et al. |
| 5,500,270 A | 3/1996 | Langdon et al. |
| 5,571,410 A | 11/1996 | Swedberg et al. |
| 5,658,413 A | 8/1997 | Kaltenbach et al. |
| 5,738,825 A | 4/1998 | Rudigier et al. |
| 6,258,593 B1 | 7/2001 | Schembri et al. |

FOREIGN PATENT DOCUMENTS

| DE | 199 52 764 | 5/2000 |
| DE | 199 17 433 | 11/2000 |
| DE | 199 48 087 | 5/2001 |
| DE | 101 22 457 | 11/2002 |
| DE | 101 52 690 | 5/2003 |
| EP | 1 281 439 | 2/2003 |
| EP | 1 281 440 | 2/2003 |
| WO | 91/09970 | 7/1991 |
| WO | 94/27137 | 11/1994 |
| WO | 95/22051 | 8/1995 |
| WO | 95/26796 | 10/1995 |
| WO | 95/33846 | 12/1995 |
| WO | 97/44132 | 11/1997 |

(Continued)

*Primary Examiner*—Michael P Stafira
(74) *Attorney, Agent, or Firm*—Friedrich Kueffner

(57) ABSTRACT

The invention relates to a flow cell comprising a layered arrangement of three plates (3-5) in which an intermediate plate (4) consisting of a flexible material is inserted between plates (3, 5) consisting of a more solid material, and at least one of the plates comprises at least one recess (15, 17) for receiving fluid, that is bordered by another plate (3, 5) of the layered arrangement. Such recesses are especially microchannels and reaction chambers. According to the invention, the plates are interconnected by means arranged parallel to the plate plane at a distance to the recess, compressing the intermediate plate.

20 Claims, 10 Drawing Sheets

FOREIGN PATENT DOCUMENTS

| | | |
|---|---|---|
| WO | 98/16315 | 4/1998 |
| WO | 99/19717 | 4/1999 |
| WO | 99/46045 | 9/1999 |
| WO | 01/02094 | 1/2001 |
| WO | 01/24933 | 4/2001 |
| WO | 03/004159 | 1/2003 |
| WO | 03/031063 | 4/2003 |

(a)

(b)

(c)

(d)

(e)

(a)

(b)

(c)

(d)

(e)

(a)

(b)

(c)

(d)

(e)

(a)

(b)

(c)

(d)

(a)

(b)

(c)

FLOW CELL CONSISTING OF LAYER AND CONNECTION MEANS

BACKGROUND OF THE INVENTION

1. Field of the Invention

The invention concerns a flow cell with a layered arrangement of three plates, in which an intermediate plate made of a flexible material is held between plates made of a more rigid material, and at least one of the plates has at least one recess for holding fluid, which recess is bounded by another plate of the layered arrangement.

2. Description of the Related Art

Miniaturized flow cells of this type are finding increasing use in analysis and sensor technology in the field of chemistry, especially biochemistry, and in medicine, especially diagnostics. The aforementioned recess can form, e.g., a microchannel, a reaction chamber with a fluid connection with the microchannel, and/or a chamber for holding a sensor, such that the dimensions of these recesses in at least one direction in space can vary between a few tens of micrometers to 100 micrometers. Depending on their construction and outfitting, flow cells of this type can completely or partially take over analyses performed in the laboratory as laboratory systems "on a chip".

Especially in regard to medical applications, it is important to be able to mass-produce these kinds of flow cells with microstructures as inexpensively as possible. Expensive glass or silicon-like substrates that allow precise microengineering by semiconductor techniques must be reserved for parts of the flow cell for which plastics are out of the question due to their material properties.

Systems similar to the flow cell described above are disclosed by U.S. Pat. No. 4,798,706, WO 01/24933, WO 99/19717, U.S. Pat. No. 5,500,270, U.S. Pat. No. 5,571,410, U.S. Pat. No. 5,658,413, U.S. Pat. No. 5,738,825, and WO 99/46045.

The above-cited document WO 01/24933 describes a flow cell that consists of three components with an elastic intermediate plate, wherein the components are held together solely by the adhesion of the contacting surfaces.

A flow cell of the aforementioned type is described in U.S. Pat. No. 5,376,252. The intermediate plate, which is made of an elastic material, has channel structures. During the operation of the flow cell, the three components are pressed together by an external clamping device, so that liquid-tight microchannels are formed. After the flow cell has been removed from the external clamping device, the connection between the plates is broken, and this results in the risk of chemical and biological contamination of the environment. Before the plates are secured in the clamping device, extensive measures are necessary to align the functionally interacting microstructures on the plates with one another.

SUMMARY OF THE INVENTION

The objective of the present invention is to create a new flow cell of the aforementioned type, which can be reliably produced and operated with less expense than previously known flow cells of this type and in which separately prefabricated units can be integrated, such as micropumps, microvalves, fluid reservoirs, and the like.

The flow cell of the invention by which this objective is achieved is characterized by the fact that the plates are connected with one another by connecting means arranged some distance from the recess in the direction parallel to the plane of the plates in such a way that the intermediate plate is compressed.

An advantage achieved by the flow cell of the invention is that microchannels, reaction chambers, and the like that are formed by the recess are permanently sealed by the compressed intermediate plate, even after disposal of the flow cell.

In a preferred embodiment of the invention, positioning elements for mutual alignment of the plates of the flow cell are arranged along the sides of the layered structure some distance from the recess, i.e., in directions parallel to the plane of the plates. These positioning elements cause structures formed in the plates when the flow cell is assembled to be automatically aligned with one another and to stay aligned in the assembled flow cell.

In an especially preferred embodiment of the invention, the positioning elements and the connecting means have common components.

It is advantageous for the connecting means and/or positioning elements to be holes and pins. One of the three plates can be provided with vertically projecting pins that fit into holes in the other plates. The pins can be thermally deformable, so that a type of connection similar to riveting can be achieved by forming heads at the free ends of the pins by suitable pressing and heating rams. These heads then secure the given plate from behind. The diameter of the pins is slightly smaller than the diameter of the holes. This difference determines the positioning accuracy of the plates relative to one another. On the other hand, when a large number of pins and holes is provided, this difference in the diameters ensures that the plates with the holes can be mounted on the plate with the pins despite position tolerances of the pins and holes.

It is advantageous for connecting means and/or positioning elements to be arranged on opposite edges of the plates, possibly in a frame-like way. Furthermore, connecting means can also be arranged in the interior of the plates at a lateral distance from the recesses. A frame-like adhesive joint or welded joint is also conceivable.

The compression of the intermediate plate can be increased if the outer plates that enclose the intermediate plate are pre-bent and then straightened during the assembly of the flow cell.

In a further refinement of the invention, at least one of the plates made of a more rigid material has holes with a counterbore for receiving the heads of the pins used for connecting the plates. Therefore, no parts project from a base plate, and the flow cell can be set down stably on a flat support surface.

At least one of the plates, especially one of the plates made of the more rigid material, can be provided with at least one recess for holding a separately prefabricated microcomponent in a positionally precise way. This microcomponent possibly consists of silicon or glass. In this connection, the recess may be provided, e.g., for the purpose of holding a pump, a valve, a sensor, a possibly surface-functionalized viewing window, a filter, a fluid reservoir, or an electrode.

It is advantageous for the microcomponent to be held in the recess by positive locking without an adhesive or welded joint.

Depending on requirements, the recess can be open both towards the intermediate plate and towards the outside.

It is advantageous for the lateral dimensions of a microcomponent positioned in the recess to be greater than the lateral dimensions of a recess that is formed in the intermediate plate and is bounded by the microcomponent, e.g., a reaction chamber. In this case, it is advantageous for a slit formed between the microcomponent and the lateral wall of the recess to be sealed by the soft intermediate plate.

Several independently functional flow cell functional units can be housed in a layered plate arrangement. Additional connecting means and/or positioning elements are possibly arranged between the functional units in order to achieve the most uniform possible surface pressure on the intermediate plate.

In a further modification of the invention, a connector, which, e.g., can have a conical outer and/or inner surface, is formed as a single piece on at least one of the plates made of the more rigid material. The conical outer surface facilitates the attachment of flexible tubes with different diameters. A connecting flexible tube with a conical end piece can be connected to a connector with a conical inner surface.

In a further advantageous refinement of the invention, the intermediate plate is compressed only in a region adjacent to the recess and possibly the connecting means. This is accomplished by shallow depressions in the intermediate plate or the adjacent plate, which are arranged some distance from the recess. This measure increases the surface pressure. In this way, the overall pressing force to be applied to ensure tightness between the plates can be reduced, and this simplifies assembly. The reduction of the pressing force also serves to increase the service life of the flow cell, since the connecting means are subject to less stress.

Recesses for holding fluid that are covered on the outside by a film, e.g., reaction chambers and microchannels, can also be formed on the flow cell. These structures can be used, e.g., to supplement the fluid network formed inside the cell.

In a further refinement of the invention, at least one of the plates has a recess with a base region that is thinner than the plate, can be deformed, and/or can be pierced with a hollow needle. By acting on the base region from the outside, it is possible, e.g., to operate integrated dispensing devices. It is possible to introduce or withdraw liquid from the outside by hollow needles.

Integrated pumps and valves can be actuated, e.g., by piezoelectric actuators. In accordance with one embodiment of the invention, electrical connecting leads are integrated in the flow cell for this purpose.

In the preferred embodiment, in which the flow cell consists of a total of three plates, the cover plate and the base plate consist of a comparatively rigid plastic with a modulus of elasticity of 1,000 N/mm$^2$ to 10,000 N/mm$^2$. The thickness of these plates is preferably 0.1 mm to 5 mm. Thermoplastics, e.g., PMMA, COC, PC, PS, LCP, PEEK, and PP, are especially preferred as materials for these plates.

The intermediate plate has a thickness of 0.5 mm to 3 mm and consists of a relatively soft plastic with a modulus of elasticity of 1 N/mm$^2$ to 10 N/mm$^2$. The plate is preferably produced by micro injection molding of thermoplastic elastomers, such as polyurethane and silicone. A plate of this type can be compressed to 50-95% of its original thickness during assembly.

Alternative materials, such as ceramics or circuit board material, can also be used, especially for the base plate. Circuit board material is especially suitable for holding electrical conductors.

The invention is explained in greater detail below with reference to specific embodiments of the invention, which are illustrated in the attached drawings.

DETAILED DESCRIPTION OF THE INVENTION

Figure 1:
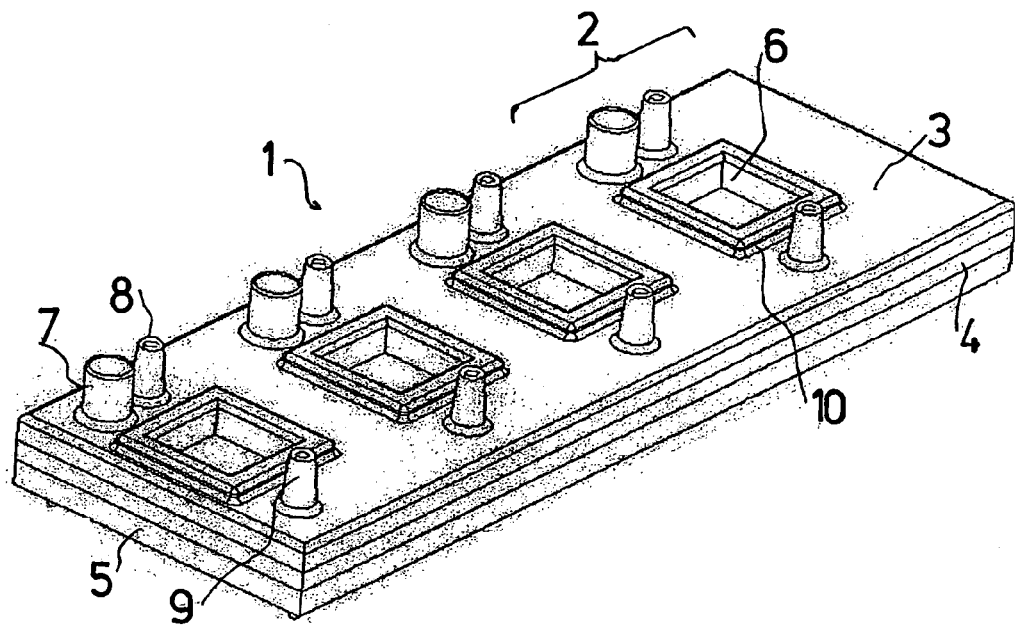
FIG. 1 shows a perspective view of a flow cell of the invention.
Figure 2:
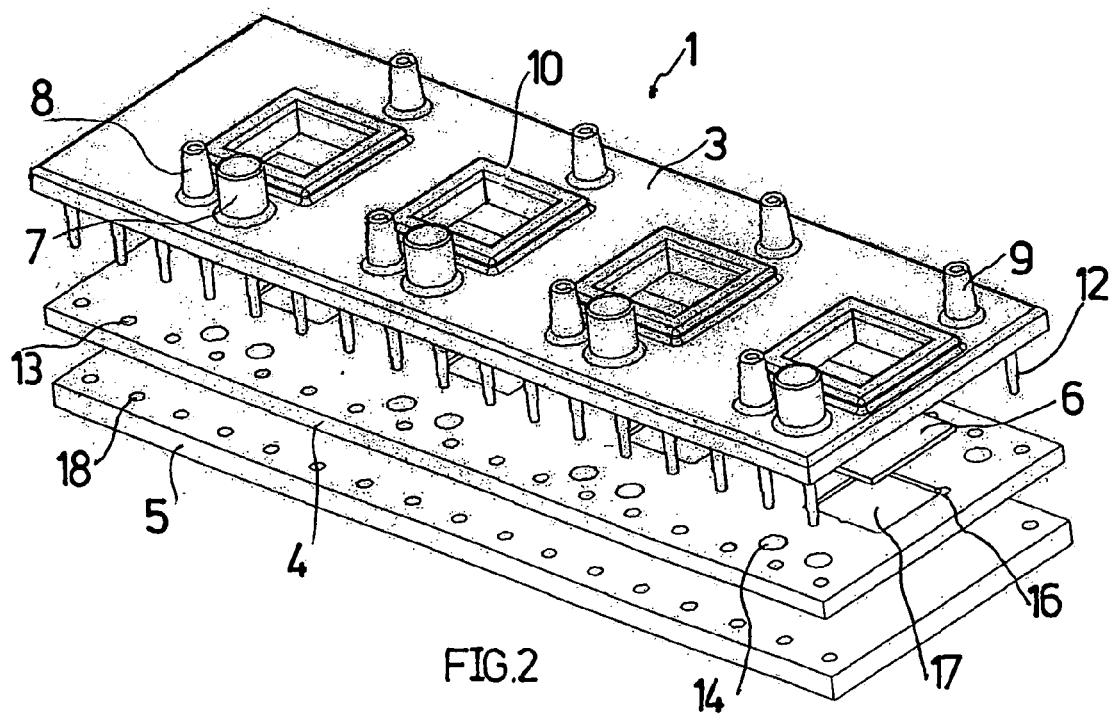
FIG. 2 shows the flow cell of FIG. 1 in an exploded oblique perspective view from the top.
Figure 3:
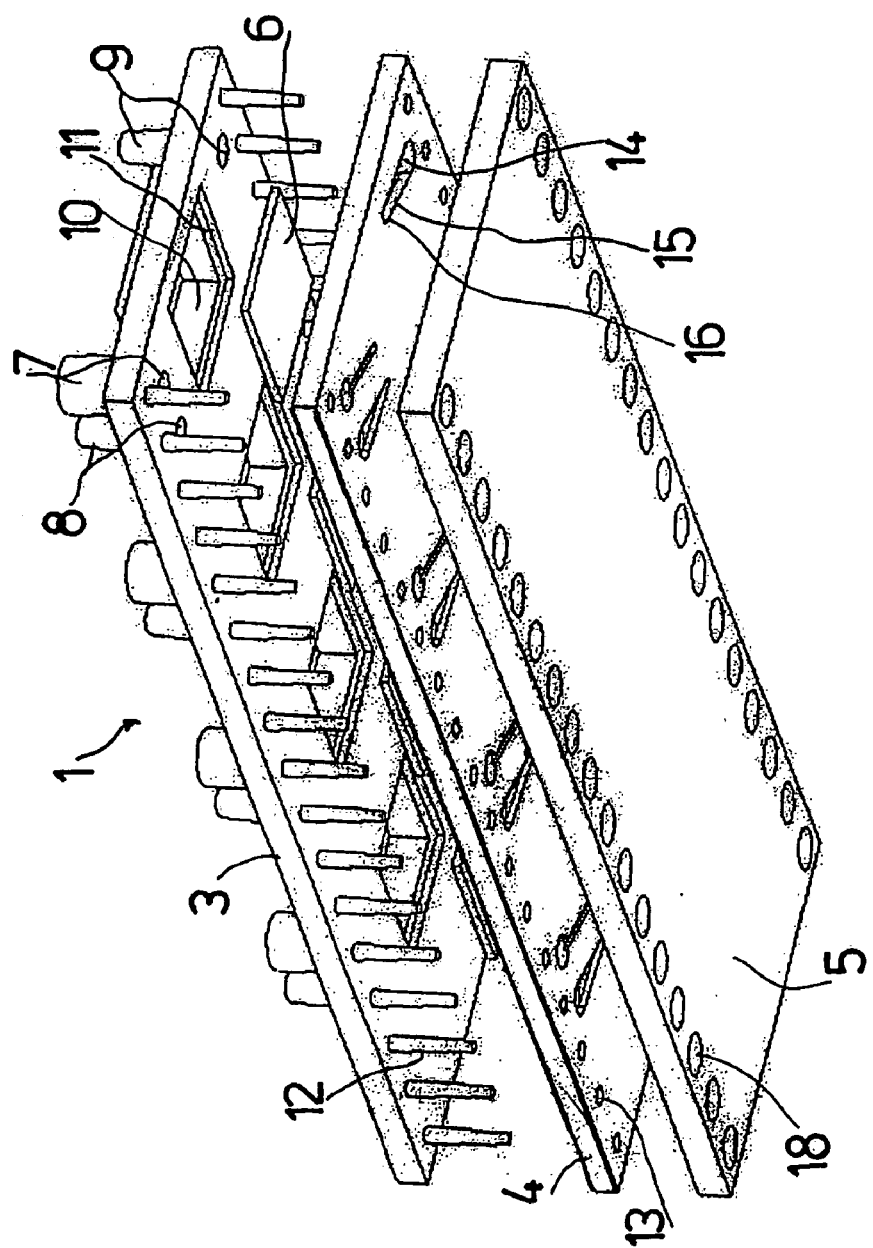
FIG. 3 shows the flow cell of FIG. 1 in an exploded oblique perspective view from the bottom.

The flow cell illustrated in FIGS. 1 to 3 has a cover plate 3, an intermediate plate 4, and a base plate 5. In the illustrated embodiment, the flow cell contains four identical functional units 2. The plates 3 to 5 are produced by replication methods, preferably micro injection molding. The outside dimensions of the plates are 5 to 200 mm, and the thickness of the plates is 0.5 to 10 mm.

Each functional unit 2 contains connections 7, 8, 9 which are formed as integral parts of the cover plate 3 on the upper surface of the cover plate, one connection in the form of a reservoir or well 7, and flexible tube connections 8 and 9. In addition, each functional unit 2 contains a microcomponent 6, which can be inserted from below in a cavity 10 that is formed in the cover plate 3 and passes completely through it.

As FIG. 3 shows, the rectangular cavity 10 has a shoulder 11 that serves as a seat for the microcomponent 6. The lateral dimensions of the cavity 10 in the area of the shoulder are made to be 0.01 to 0.1 mm greater than the corresponding dimensions of the microcomponent that is to be inserted in it. The depth of the shoulder is preferably 0.01 to 0.1 mm smaller than the thickness of the microcomponent 6, so that in its installed state, the microcomponent 6 protrudes from the underside of the cover plate 3.

In addition, positioning pins 12 are formed on the cover plate 3. Their length is greater than the combined thickness of the intermediate plate and the base plate. As FIGS. 2 and 3 show, a linear row of these pins is formed on both longitudinal sides of the cover plate 3. The arrangement of the positioning pins allows a uniform surface pressure in the assembled state of the plates. The distance between the positioning pins is preferably less than 10 mm.

Whereas the injection-molded plates 3 and 5 are made of a rigid plastic, e.g., PMMA, the material of which the intermediate plate 4 is made is a soft, possibly elastic, synthetic material, e.g., silicone.

The intermediate plate 4 has positioning holes 13 that correspond to the positioning pins 12. Their inside diameter is preferably 0.01 mm to 0.2 mm larger than the diameter of the positioning pins 12.

Through-holes 14 are also formed in the intermediate plate. The positions of these through-holes 14 correspond to the positions of the well 7 and the flexible tube connections 8 and 9. Microchannels 15 on the underside of the intermediate plate 4 have cross-sectional dimensions that conform to the requirements on the flow cell. The cross-sectional areas are typically between 0.01×0.01 mm$^2$ and 1×1 mm$^2$. The microchannels 15 are connected by connecting holes 16 with a reaction chamber 17 formed on the upper side of the intermediate plate 4. The reaction chamber 17 is formed as a rectangular recess and is bounded on its upper side by the underside of the microcomponent 6. The position of the connecting holes 16 is selected in such a way that it is inwardly displaced relative to the outer edge of the microcomponent, preferably by 0.1 to 1 mm. This allows liquids to pass through the connecting holes 16 from the microchannels 15 into the reaction chamber 17 without leakage.

Positioning holes 18 that correspond to the positioning pins 12 on the cover plate 3 are formed in the base plate 5. The diameter of the positioning holes 18 is preferably 0.5 to 5 mm smaller than the diameter of the positioning pins 12 in the welded state. In the assembled state of the plates, the microchannels 15 are bounded by the flat upper side of the base plate 5.

To assemble the flow cell described above, the microcomponents 5 are first inserted in the cavities 10 of the cover plate 3, and then the intermediate plate 4 and the base plate 5 are mounted on the positioning pins 12 of the cover plate 3. The positioning pins 12 enter the positioning holes 13 and 18 of the intermediate plate and base plate, respectively.

A pressing device is used to press the stack of plates together using a predetermined pressure. To fix the plates in the position into which they have been pressed, the positioning pins are fused and pressed into the through-holes, e.g., in an ultrasonic welding process. This causes the positioning pins to expand below the base plate. The positioning pins thus grip the base plate from behind. After they have cooled and solidified, they hold the stack of plates together while largely maintaining the pressure previously applied by the pressing device. The soft compressed intermediate plate compensates manufacturing tolerances of the plastic parts and has a sealing effect, so that recesses in the intermediate plate, i.e., the microchannels and reaction chambers, that open towards the cover plate and base plate are sealed liquid-tight.

The flow cell described here is suitable, e.g., for the detection of samples with a certain DNA sequence. In this case, the microcomponent 6 is a transparent glass chip, the underside of which carries a large number of DNA probe molecules. It is advantageous for the dimensions of the detector surface carrying the probe molecules to be smaller than the lateral dimensions of the cavity 10 of the cover plate 3. This provides a simple means of detecting photons, in this case, of fluorescence light, emitted inside the flow cell through the glass chip by conventional methods of detection.

The flow cell can be compatible with standard bioengineering instruments.

To carry out a hybridization, a sample solution is introduced into the well. The sample quantity is typically a few microliters. The flow cross sections can be selected in such a way that the sample liquid reaches the reaction chamber by virtue of the capillary action of the microchannel 15, the connecting holes 16, and the reaction chamber 17 and comes into contact with the underside of the glass chip, to which the probe molecules are bound. In addition, the transparent glass chip allows visual monitoring of the level of filling of the reaction chamber. Alternatively to filling by capillary action, there is the possibility of drawing the sample liquid into the reaction chamber by suction. To this end, the flexible tube connection 8 can be closed, and the flexible tube connection 9 can be used as a sample outlet and can be connected to an external pump. Negative pressure produced at the sample outlet 8 is transferred to the sample liquid in the well 7. This causes the sample liquid to be drawn into the reaction chamber 17. A hybridization reaction then occurs there with the DNA probe molecules on the glass chip. This process can be assisted by alternately building up a negative pressure and a positive pressure by means of the pump connected to the flexible tube connection 9. This results in relative movements of the sample liquid with respect to the surface of the glass chip. The reaction can also be assisted by continuous or intermittent temperature adjustment of the reaction chamber. The temperature adjustment can be realized with thin-film resistors, which are applied in the form of electrical conductive tracks on the surface of the base plate and are explained in greater detail below in connection with FIG. 11. The conductive tracks can be arranged directly below the reaction chamber 17. The intermediate layer formed by the intermediate plate between the reaction chamber and the conductive tracks serves to homogenize the temperature distribution over the bottom surface of the reaction chamber.

To flush the reaction chamber upon completion of the hybridization reaction, the flexible tube connection 8 can be connected to an external reservoir that contains a flushing liquid, which is drawn into the reaction chamber by a pump connected to the flexible tube connection 9. The result of the hybridization reaction can then be determined by fluorescence measurement with detection of the light transmitted through the transparent glass chip.

Figure 4:
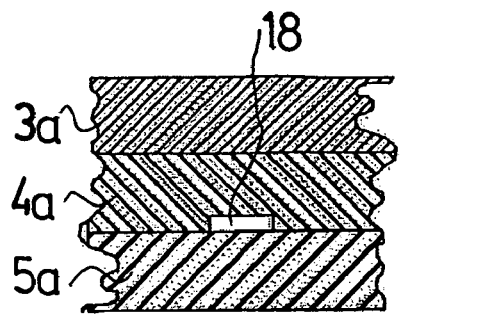
FIG. 4 shows various designs and arrangements of microchannels in a flow cell of the invention.
Figure 4:
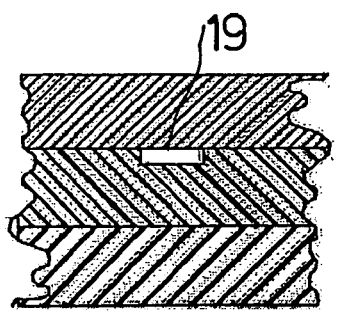
Figure 4:
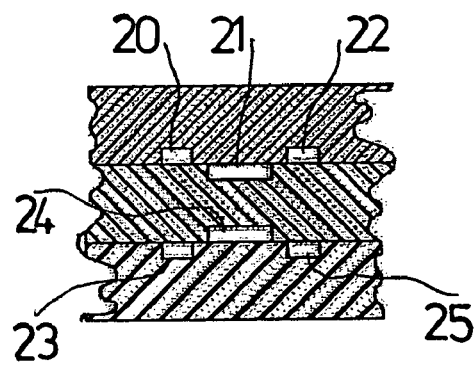
Figure 4:
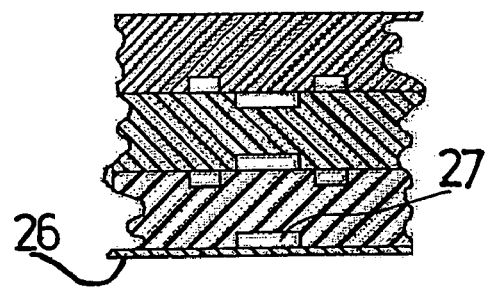
Figure 4:
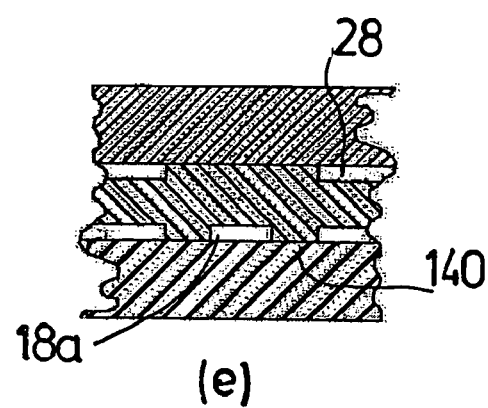

FIG. 4 shows various possibilities for forming microchannels within an arrangement that comprises a cover plate 3a, an intermediate plate 4a, and a base plate 5a.

In accordance with FIG. 4a, there is the possibility of arranging a microchannel 18 in the manner of the arrangement of the microchannel 15 of the specific embodiment described above, i.e., on the underside of the intermediate plate 4a. In this case, the channel 18 is incorporated in the intermediate plate 4a and is covered by the flat upper surface of the base plate 5a. The dimensions of the channel cross section in both spatial directions are preferably 0.01 to 1 mm.

FIG. 4b shows a microchannel 19 incorporated in the intermediate plate 4a at the boundary between the cover plate 3a and the intermediate plate 4a and covered by the flat lower surface of the cover plate 3a.

In the embodiment illustrated in FIG. 4c, several microchannels 20 to 25 are formed both at the boundary between the cover plate and intermediate plate and at the boundary between the intermediate plate and the base plate. The position and cross-sectional dimensions of the channels can be adapted to the specific requirements of the given fluid network of the flow cell, so that even very complex processes involving different media can take place in a flow cell of this type. The microchannels at a given interface can merge, e.g., to distribute a fluid stream from one channel to several channels or, conversely, to bring several channels together to form one channel. The microchannels can also intersect to allow the metered delivery or mixing of fluids.

A cover film 26 in accordance with FIG. 4d opens up further possibilities for the formation of microchannels 27 and thus even more complex networks. The film 26 can be applied in the usual way by adhesion, welding, or bonding on the underside of the base plate. The use of a supplementary film of this type can be considered especially when it is important to cover microchannels or a reaction chamber with only a small thickness of material, e.g., 0.002 mm to 0.2 mm, which are customary thicknesses of films. Thin films 26 allow the detection of light through the film. In addition, a thin layer of material allows efficient heating of liquids that are being conveyed behind the film, as is necessary in various biochemical processes, e.g., PCR.

In the embodiment illustrated in FIG. 4e, recesses 28 are formed on the upper surface and lower surface of the intermediate plate 4*a*, which reduce the contact area between the plates of both sides of a microchannel 18*a*. This increases the surface pressure in the regions 140, i.e., the contact pressure required for sealing is reduced. It is also advantageous that this simultaneously reduces the necessary tensile stress of the positioning or connecting pins, which makes the assembly process easier and increases the service life of the flow cell.

Figure 5:
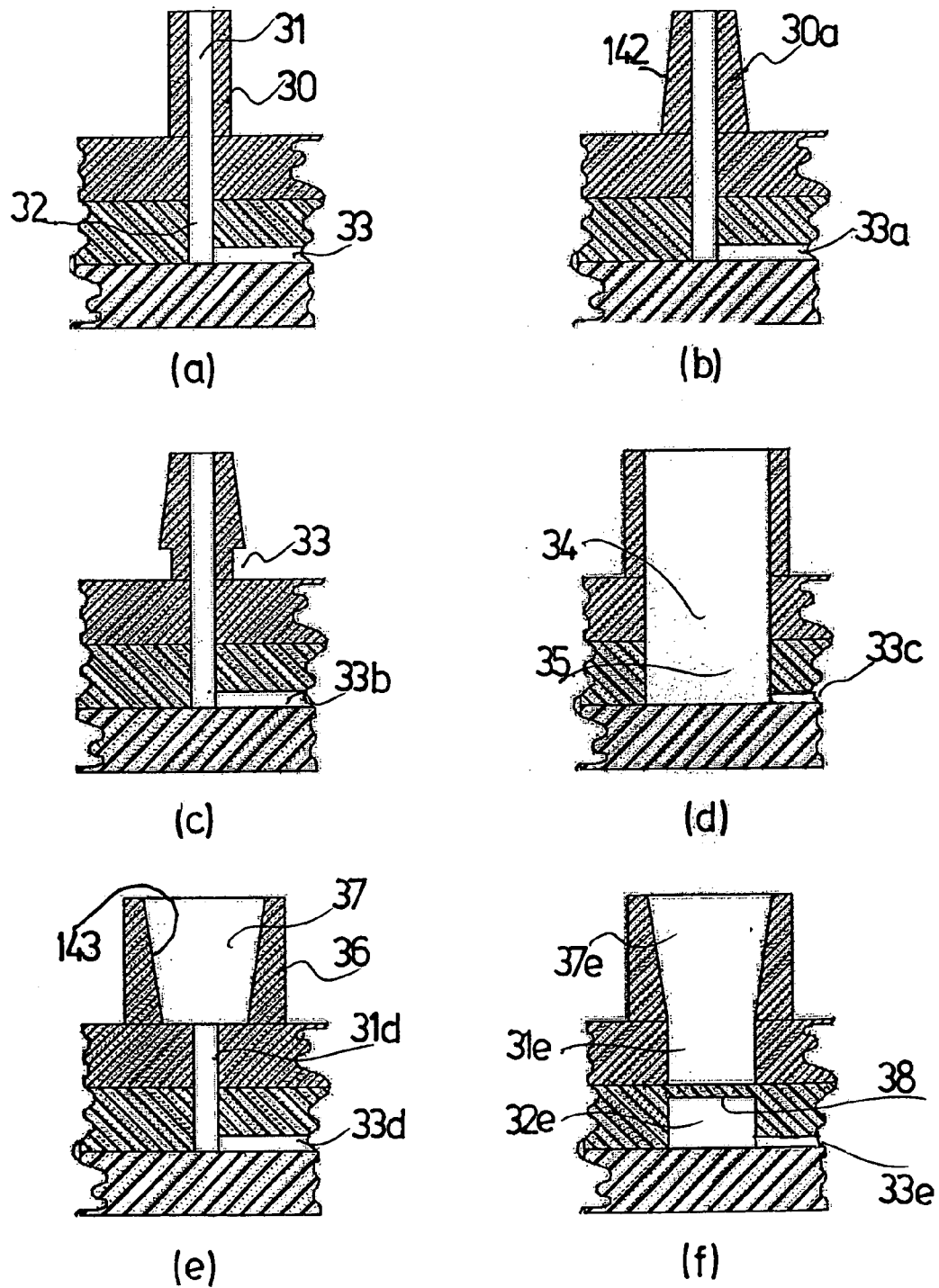
FIG. 5 shows various embodiments of connections to the flow cell of the invention.

FIG. 5 shows various connections that can be used, e.g., for the flow cell illustrated in FIGS. 1 to 3.

FIG. 5*a* shows an especially simple connection to which a flexible tube can be attached. The cover plate is joined with a capillary tube that consists of a cylindrical capillary wall 30 and a cylindrical capillary hole 31. The capillary hole 31 continues through the entire cover plate. A capillary hole 32 is formed in the intermediate plate and corresponds in its diameter and position to the capillary hole in the cover plate. The capillary hole 32 opens into a microchannel 33 at the boundary between the intermediate plate and the base plate. The outside diameter of the capillary wall 30 is typically 0.5 mm to 2 mm, and the inside diameter is typically 0.1 mm to 1 mm. The protruding length of the flexible tube connection typically varies from 1 mm to 10 mm.

FIG. 5*b* shows a flexible tube connection with a capillary wall 30*a* with a conical outer surface 142. The conical shape has the advantage of facilitating the attachment of a flexible tube. In particular, flexible tubes with different inside diameters can be attached. Typical conical angles are 1-15°.

FIG. 5*c* shows a flexible tube connection that is provided with an undercut 33 at its junction with the cover plate. This has the advantage of increasing the force with which an attached flexible tube is held on the flexible tube connection.

FIG. 5*d* shows a connection where openings corresponding to the capillary holes 31 and 32 are expanded to form reservoir volumes or wells 34 and 35. The reservoir volume 35 communicates with a microchannel 33*c*. Typical outside diameters of a capillary wall 30*c* are 3 mm to 10 mm, and typical inside diameters are 2 mm to 9 mm. The length protruding from the cover plate is typically 0.1 to 10 mm.

FIG. 5*e* shows a connection in the form of a plug connection with a plug wall 36 and a plug opening 37, which ends on the upper surface of the cover plate and has an internal taper. A conical connector with an attached flexible tube can be inserted in the plug opening 37 and adheres fluid-tight to the conical inner surface 143. The conical angle is preferably 2-10°. The inside diameter of a capillary hole 31*d* in the cover plate is the same as the inside diameter of the connector and is aligned with it: This makes it possible to avoid dead volumes at the junction.

In the embodiment of a connection illustrated in FIG. 5*f*, a plug opening 37*e* with a conical inner surface 142 is immediately followed by a hole 31*e* in the cover plate without a change in diameter. A reservoir volume 32*e* in the intermediate plate is aligned with the hole 31*e* and is separated from the hole 31*e* by a partition 38 that serves as a septum. If liquid is to be introduced into the flow cell with an injection needle, the partition 38 is pierced by the injection needle. A suitably soft and elastic material used for the partition ensures that the point of penetration by the injection needle will be sealed fluid-tight again after the injection needle has been withdrawn. Typical lengths of the sides of the septum are 1 mm to 5 mm. The thickness is preferably 0.05 to 0.5 mm. The latter embodiment is advantageous especially when the flow cell has microcomponents or other regions which, in the period between the manufacture and use of the flow cell, during its use, and/or after its disposal, may not be exposed to the outside environment and must even be sealed gastight, e.g., to prevent oxygen from entering or to prevent evaporation of enclosed liquids. Furthermore, this embodiment is advantageous in the case of automated introduction and removal of liquids, in which case the injection needles that are used can be integrated in metering systems of this type. In addition, a connection of this type is advantageous if it is necessary to allow air to escape from the microchannels and reaction chambers. Air can flow out of the flow cell through hollow needles penetrating the septum and can possibly be drawn out by suction. Complex processes occurring in the flow cell can be controlled in this way.

Figure 6:
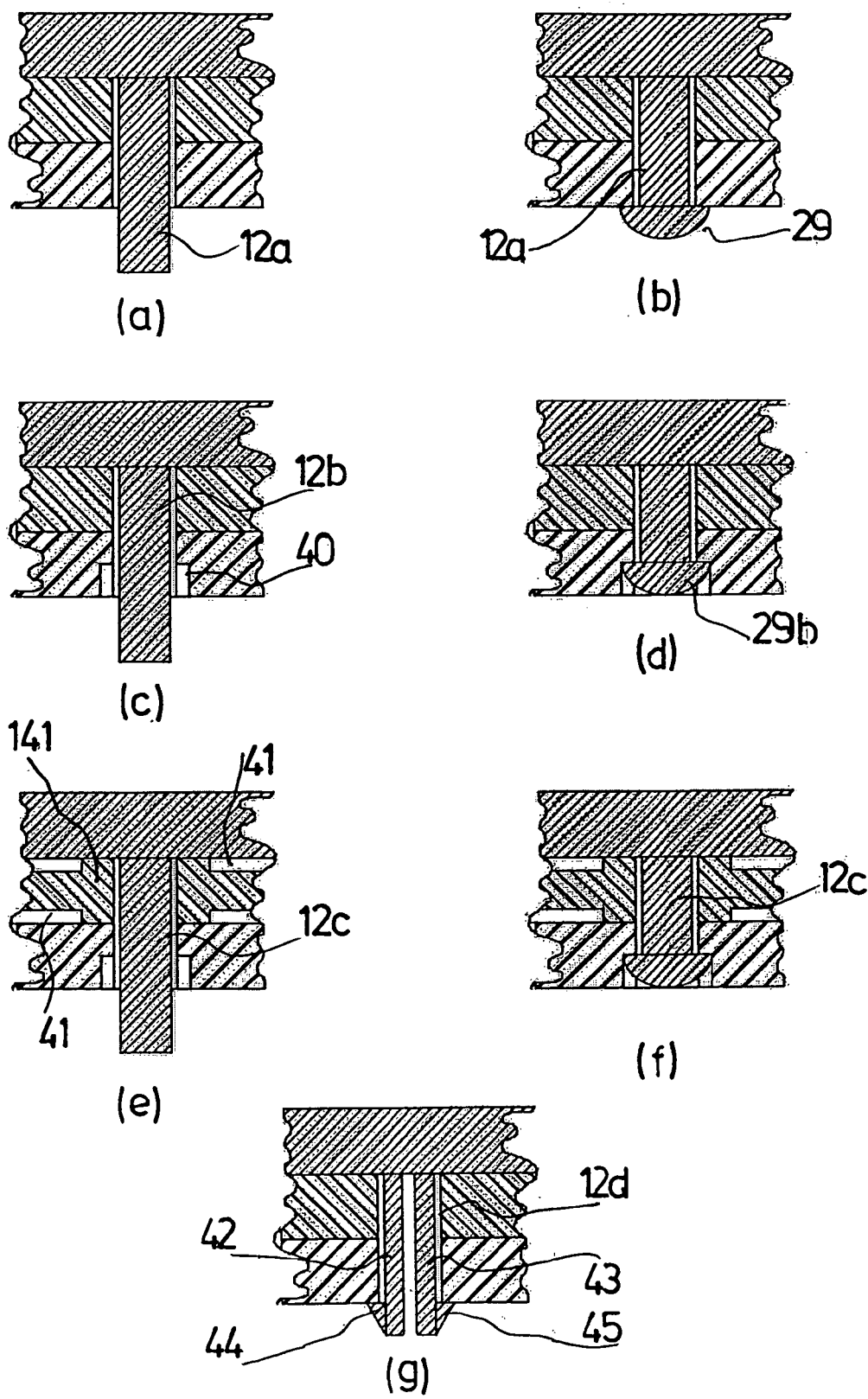
FIG. 6 shows various types of connections between the plates of a flow cell of the invention.

FIG. 6 shows several variants for the positioning and connection of the cover plate, intermediate plate, and base plate.

In FIGS. 6*a* and 6*b*, a preferably cylindrical positioning pin 12*a* is formed on the underside of the cover plate and is joined with the cover plate to form a single piece. The intermediate plate and the base plate have correspondingly arranged positioning holes. The inside diameter of the holes is 0.1 mm to 0.2 mm greater than the diameter of the positioning pins. The length of the positioning pin is 0.5 mm to 5 mm greater than the combined thickness of the intermediate plate and the base plate. During the assembly of the flow cell, the plates are pressed together perpendicularly to the plane of the plates by means of a pressing device. The pins are pressed by mechanical action, thermal action, and/or ultrasonic action, and a head 39 is formed on each pin, as illustrated in FIG. 6*b*. Possibly after cooling and release of the pressing device, the head 39 holds the plates together, and the pressure previously exerted by the pressing device is largely maintained at the same level.

In the embodiment of FIGS. 6*c* and 6*d*, a positioning hole with an expansion 40 is formed on the underside of the base plate. The size of this expansion is selected in such a way that it can accommodate a head 29*b* formed in the manner described above, such that the head 29*b* is preferably moved back into the expansion from the underside of the base plate. This offers the advantage that the flow cell then has a flat bottom surface, so that it can rest stably on a flat support surface.

In accordance with FIGS. 6*e* and 6*f*, the upper side and the lower side of a soft and/or elastic intermediate plate has recesses 41, which reduce the contact surface between the plates to a region 141 around the positioning holes. Therefore, less contact pressure is needed to achieve fluid-tightness. It is advantageous that this also reduces the tensile stress of the positioning or connecting pins. Therefore, the flow cell is under less internal stress, which increases its service life and makes the assembly process easier.

In the embodiment of FIG. 6*g*, positioning pins 12*d* are provided, which are elastically designed and have two spring arms 42 and 43 arranged some distance apart, each of which has a back-tapered expansion 44 and 45, respectively, at its free end. The intermediate plate and the base plate are mounted on the pins 12*d*, which causes the spring arms 42, 43 to be compressed. After the expansions 44, 45 have passed through the plates, the spring arms 42, 43 expand again. The expansions 44, 45 hold the plates together. It is advantageous that assembly requires hardly any mechanical loading and no thermal loading of the positioning pin 12*d* and the plates.

Figure 7:
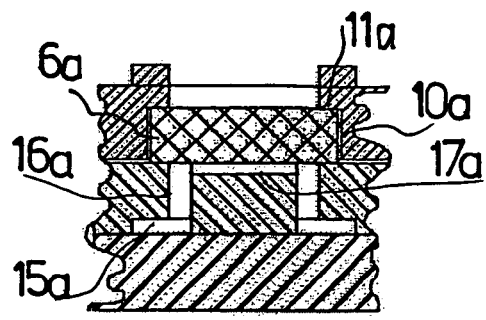
FIG. 7 shows various embodiments of microcomponents integrated in the flow cell of the invention.
Figure 7:
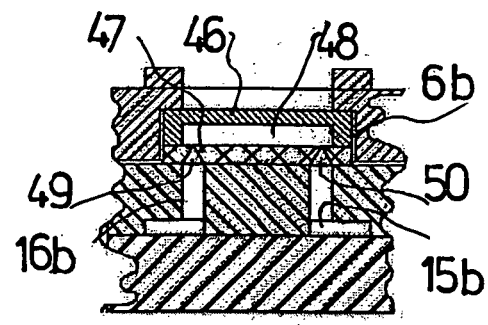
Figure 7:
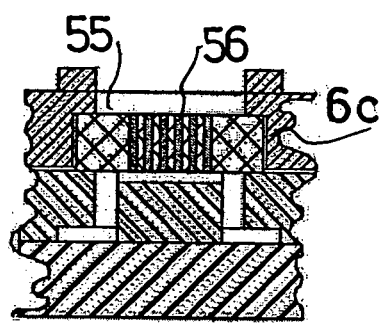
Figure 7:
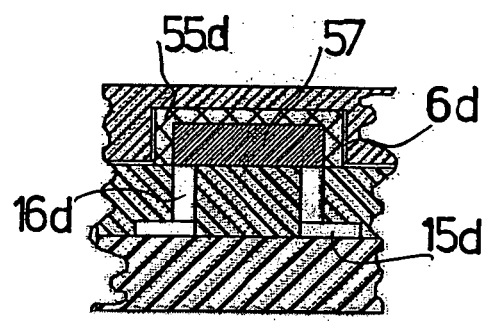
Figure 7:
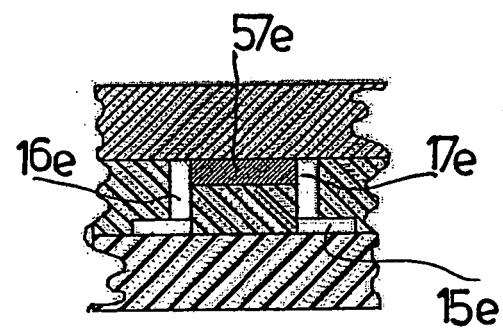

FIG. 7 shows several variants of microcomponents and their integration in the flow cell.

In FIG. 7*a*, a single-piece microcomponent 6*a* is inserted in a rectangular cavity 10*a* with a shoulder 11*a*. The sides of the shoulder are 0.01 mm to 0.1 mm longer than the corresponding sides of the microcomponent. The microcomponent 5*a*, which rests against the shoulder 11*a*, protrudes from the cavity 10*a* by 0.01 mm to 0.1 mm. In this way, the edge of the microcomponent is sealed by the intermediate plate.

Recesses for a reaction chamber 17a, connecting holes 16a, and microchannels 15a are formed in the intermediate plate.

The reaction chamber 17a is bounded on one side by the microcomponent 6a. The connecting holes 16a are inwardly displaced relative to the outer edge of the microcomponent 6a by 0.1 mm to 1 mm. This allows liquid to be conveyed through the connecting holes from the microchannels into the reaction chamber without leakage. The microcomponent is held in the recess in a positionally accurate way by positive locking without an adhesive or welded joint with one of the plates. This prevents impairment of functionalized surfaces by adhesives or welding heat.

The single-piece microcomponent can have a variety of functions. An unpatterned microcomponent made of glass can serve only as a window, through which the course of the reaction inside the flow cell can be observed and/or detected. A glass, silicon, metal, or plastic microcomponent the underside of which has bound molecules, especially DNA probe molecules, in a matrix configuration can be used for the above-described hybridization process in the flow cell. A microcomponent made of metal can be used, e.g., as a catalyst, which controls the processes occurring in the reaction chamber. In addition, the microcomponent could be a thermal conductor that conducts heat from an external source into the reaction chamber. The microcomponent can also be an electrical conductor that constitutes an electrode, e.g., to convey liquid within the flow cell by means of electrophoresis or electroosmosis.

FIG. 7b shows a detail section of a flow cell with a two-piece microcomponent 6b. The microcomponent consists of a cover 46 and a base 47, which are connected with each other in a fluid-tight manner. A chamber 48, which can serve as a reaction chamber or a microchannel, is formed between the cover and the base. The chamber 48 communicates with microchannels 15b in the intermediate plate through holes 49 and 50 and connecting holes 16b. A design of this type is advantageous if a fluid network requires capillary holes and/or channels the dimensions of which are between 0.1 µm and 5 µm at least in a direction perpendicular to the fluid flow and which, therefore, cannot be produced or can be produced only with very great difficulty by molding techniques as integral parts of the cover plate, intermediate plate, or base plate. In these cases, combinations of a silicon base and a glass cover are possible for the microcomponent. The parts can be joined fluid-tight by means of well-known bonding techniques, and the silicon part can have etched structures in the submicrometer range for this purpose.

FIG. 7c shows a microcomponent 6c that consists of a base part 55 in which several microelectrodes 56, which form an electrode field, are firmly embedded. Materials that can be used for the base part 55 are ceramics or plastics, and materials that can be used for the electrodes are metals, such as gold, silver, or platinum, as well as electrically conductive plastic compounds that contain metal or carbon fibers. In addition, conducting polymers, such as polyaniline, polypyrrole, or polythiophene, can be used for the electrodes. Microcomponents of this type make it possible to construct flow cells with hybridization chambers with the use of well-known electrical detection methods.

FIG. 7d shows another two-piece microcomponent 6d that consists of a base part 55d in which a filter element 57 has been embedded. The filter element consists of a porous spongy material, preferably plastic, with pores whose dimensions are typically on the order of 0.1 µm to 100 µm. The filter element communicates via connecting holes 16d with microchannels 15d, which are formed at the boundary between the intermediate plate and the base plate. The filter element 57 provides a simple means of filtering media conveyed through the flow cell, with the liquid entering the filter element through one of the connecting holes and exiting the filter through the other connecting hole. The filter element can also serve as a capillary pump. If the medium comes into contact with the filter material by capillary action through the microchannels 15d, it is sucked into the fine-pored filter material. The fluid flow in another part of the fluid network can be controlled in this way. The fluid flow comes to a standstill when the absorption capacity of the filter material is exhausted. In addition, a microcomponent of this type can be used as a waste container to store reaction products or other media after completion of a process in the flow cell, e.g., an analysis. The use of the microcomponent as a waste storage container of this type also prevents unwanted escape of liquid after disposal 6f the flow cell.

In the embodiment illustrated in FIG. 7e, a reaction chamber 17e incorporated in the intermediate plate is filled with a filter element 57e. The filter element communicates with microchannels 15e via connecting holes 16e. In this embodiment, the cover plate does not need to have any receiving cavity or other structure in the area of the filter element, which simplifies the design of the flow cell.

Figure 8:
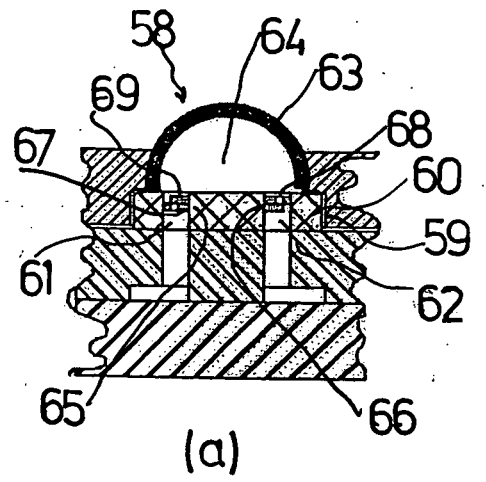
FIG. 8 shows various embodiments of micropumps in a flow cell of the invention.
Figure 8:
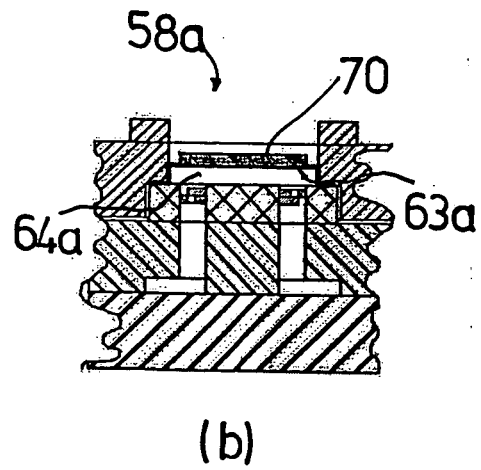
Figure 8:
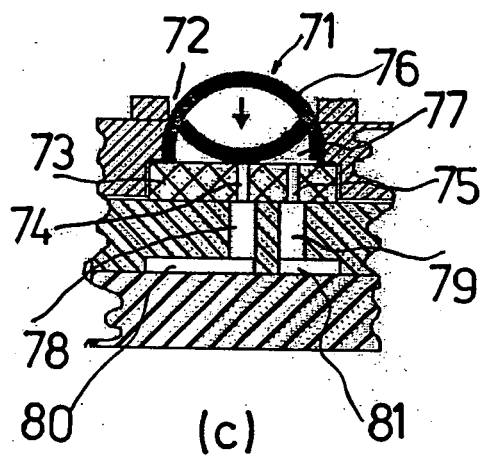
Figure 8:
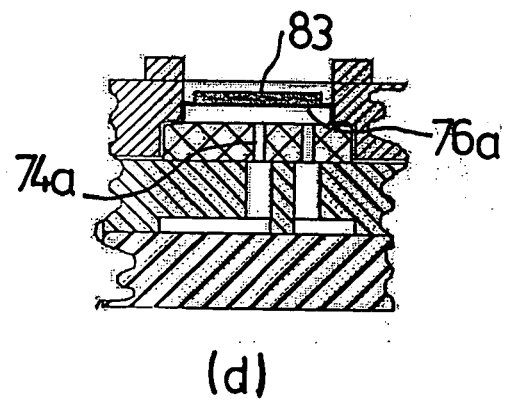
Figure 8:
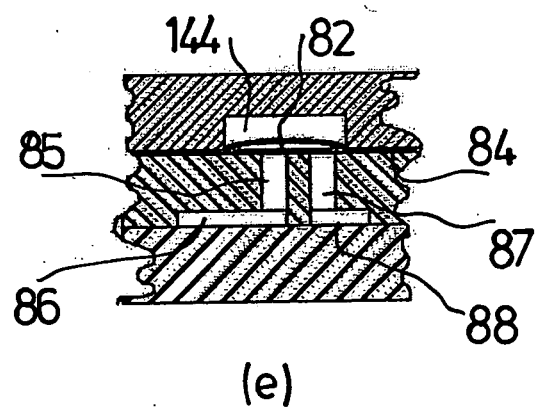

FIG. 8 shows examples of the integration of micropumps and microvalves in a flow cell that has a cover plate, an intermediate plate, and a base plate.

In FIG. 8a, a micropump 58 is inserted in a preferably cylindrical cavity 59 on the upper side of the cover plate. The pump has a base part 60 with an intake channel 61 and a delivery channel 62. An elastic actuator membrane 63, which is mounted on the base part and whose marginal region is rigidly connected with the base part, forms a pump cavity 64 between the actuator membrane and the base part. An intake valve 65 is mounted in the intake channel adjacent to the pump cavity, and a delivery valve 66 is installed in the delivery channel. Each valve has a seating component 67 with a port 68 and a spring component 69 that opens or closes the port. Periodic operation of the actuator membrane 64 results in alternate opening and closing of the intake and delivery valves, so that fluid is conveyed from the intake-channel to the delivery channel. In the cavity, which is open on one side, the valves are accessible from the outside. Accordingly, an external device can be used to operate the actuator membrane 63. In the simplest case, this device has a plunger, which compresses the, e.g., hemispherically shaped, actuator membrane and, when it is pulled back, allows the membrane to expand again elastically. It is advantageous for a pumping function involving a prefabricated component incorporated in the cell to be integrated in the flow cell, and various designs of pumps, e.g., with different flow rates, or pumps made of different materials, such as plastic or silicon, can be flexibly incorporated, as required, by reliable production methods with little expense. Operation of the pump requires only a mechanical interface, e.g., in the form of a plunger or, in the simplest case, by manual operation, which keeps the expense for an external pumping device to operate the flow cell low.

FIG. 8b shows a micropump 58a integrated in a flow cell. The micropump has a pump membrane 63a, which is adhesively bonded with a piezoelectric disk 70. Periodic application of a voltage, preferably between +400 volts and −100 volts, causes a downward or upward deflection of the pump membrane and thus a decrease or increase in the volume of a pump cavity 64a. The micropump can have dimensions of only a few millimeters in each spatial direction, so that it occupies only a small amount of space within the flow cell. The use of pumps of these types would be considered especially if they are to be made of silicon, whose properties do not allow mechanical contact from the outside, or if operation of the pump from the outside is not possible in the first place. The operation of the pump merely requires an electrical connection.

FIG. 8c shows the integration of a microvalve 71 in a flow cell. The microvalve 71, which is arranged in a preferably cylindrical cavity 72 in the cover plate, has a base part 73 with an intake channel 74 and a delivery channel 75. At least one of these channels is arranged eccentrically. An elastic actuator membrane 76, which is preferably produced in the form of a hemispherical shell, is joined at its edges with the base part, and a flow region 77 is formed between the actuator membrane and the base part. In the undeformed state of the actuator membrane, the valve connects microchannels 80 and 81 in the intermediate plate via connecting holes 78 and 79. The intake channel 74 can be closed, and thus the flow through the flow region can be interrupted, by pushing in the actuator membrane. Since the microvalve is accessible from the outside, it can be operated by an external device in a manner similar to that described above for the micropump. It is advantageous for the valve function to be integrated in the flow cell by incorporating a prefabricated component. This reduces assembly expense and ensures a high degree of flexibility with respect to the use of different valve assembly components.

FIG. 8d shows another variant for the integration of a microvalve. Instead of the hemispherical elastic actuator membrane, a flat actuator membrane 76a is provided, which is adhesively bonded with a piezoelectric disk 83. The application of a voltage, preferably +400 volts, causes a downward deflection of the actuator membrane, which in turn closes an intake channel 74a and interrupts the flow of fluid through the valve. When the voltage is shut off, the actuator membrane returns to its original flat shape, and fluid is again conveyed. This embodiment is advantageous if valves with especially small dimensions of only a few millimeters in each spatial direction are to be integrated in the flow cell, if microvalves made of silicon are to be integrated, whose brittle material does not permit operation from the outside, or if operation from the outside is not possible or practical in the first place. The operation of the pump merely requires an electrical connection.

FIG. 8e shows another example of the integration of a microvalve in a flow cell. The underside of a cover plate has a film 84 that is joined with the cover plate, e.g., by adhesive bonding or welding. A connecting hole 85 is formed in the intermediate plate. It serves as a valve intake and is in fluid connection with a microchannel 86 on the underside of the intermediate plate. Another connecting hole 87 serves as a valve outlet and communicates with a microchannel 88 in the intermediate plate. The lateral dimensions of the microchannel are preferably greater than the cross-sectional dimensions of the connecting holes. If a fluid is present under pressure at the valve intake, this causes deflection of the film 84 into a recess 144 in the cover plate. In the deflected state of the film, fluid can flow through a flow region 82 of the valve. If a counterpressure is present at the recess 144, e.g., a counterpressure, preferably air pressure, produced by an external pump, this causes the valve film to move back and rest against the upper surface of the intermediate plate, thereby closing the valve intake. It is advantageous for a valve function to be integrated in the flow cell solely by a valve film without additional microcomponents.

Figure 9:
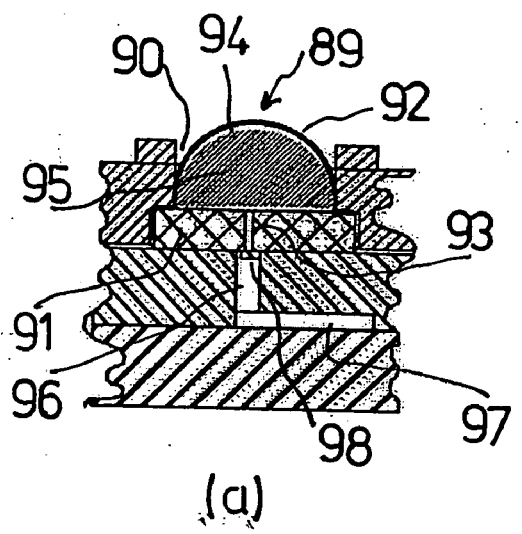
FIG. 9 shows various embodiments of valves in a flow cell of the invention.
Figure 9:
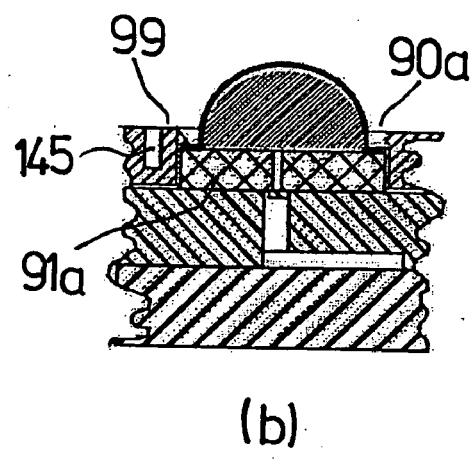
Figure 9:
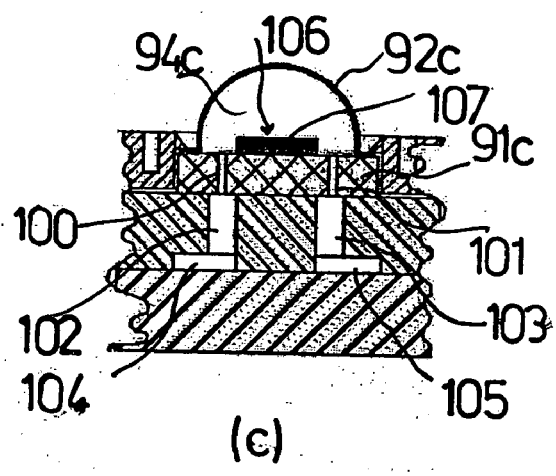
Figure 9:
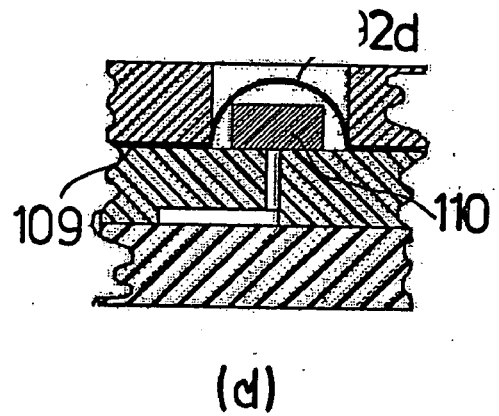

FIG. 9 shows various embodiments of liquid reservoirs integrated in a flow cell.

In FIG. 9a, a reservoir 89 is inserted in a cavity 90 in the cover plate. The reservoir consists of a preferably cylindrical base part 91 and a reservoir cover 92 in the form of a hemispherical shell formed, e.g., by thermoforming. A capillary channel 93 passes through the base part. A reservoir volume 94 is filled at least partially with a liquid 95, e.g., a buffer solution; which is necessary for the operation of the flow cell, e.g., for flushing. The reservoir volume 94 communicates with a microchannel 97 through the capillary channel 93 and a connecting hole 96. To avoid the unwanted escape of liquid from the reservoir, e.g., due to shaking of the flow cell, the upper side of the intermediate plate has a spring element 98, which closes the capillary channel fluid-tight. To release liquid contained in the reservoir, pressure is applied to the cover 92, which has a thickness of 0.02 mm to 0.2 mm, causing the cover to deform. This deformation results in displacement of liquid from the reservoir. Typical volumes of reservoirs of this type are 10-1,000 microliters. A reservoir of this type has the advantage that it makes it possible to minimize the equipment-related expense of operating the flow cell. The flow cell can be used, e.g., on site, independently of laboratory equipment, such as metering or filling devices.

In the embodiment illustrated in FIG. 9b, a cavity 90a is provided in a cover plate. Opposing spring elements 99 with a catch are formed at the cavity by recesses 145. To join the reservoir fluid-tight with the flow cell, the reservoir is pressed into the cavity of the already finished flow cell, which causes it to lock into place on the spring elements 99 and to be secured fluid-tight in the cavity 90a by the spring tension. This has the advantage that a reservoir can be optionally integrated after the flow cell has been manufactured and assembled. For the user, this means greater flexibility in the use of the flow cell. In particular, different fluids can be used with the same flow cell design. The design shown in FIG. 9b is otherwise the same as the design shown in FIG. 9a.

FIG. 9c shows a reservoir integrated in a flow cell. The reservoir has a base part 91c, in which a reservoir inlet 100 and a reservoir outlet 101 are formed. The reservoir inlet and outlet communicate with microchannels 104 and 105 at the boundary between the intermediate plate and the base plate via connecting holes 102 and 103. A cover 92c that consists of a thermally deformed film is joined at its edges with the base part 91c. A region 106 that contains liquid in the form of a drying reagent 107 to be introduced into the flow cell is formed inside a reservoir volume 94c. To release the drying reagent, a flushing liquid in which the drying reagent is soluble can be introduced. This flushing liquid can be conveyed into the intermediate plate continuously or discontinuously through the reservoir outlet 101.

FIG. 9d shows another embodiment, in which a recess 108 is provided in the cover plate. A film 109 is attached by adhesive bonding or welding to the edge of the opening of the recess that faces the intermediate plate. The film 109 forms an upward bulge within the recess, which serves as a cover 92d for the reservoir. Between the upper side of the intermediate plate and the cover 92d, there is a liquid reservoir 109, e.g., in the form of a sponge, which holds liquid by capillary action and prevents undesired conveyance of liquid during the assembly or operation of the flow cell. Liquid can be released from the reservoir by plastic deformation of a reservoir cover 92d formed by the film 109. During the assembly of the flow cell, the liquid reservoir 110 with its liquid contents is placed in the cover plate, which is permanently joined with the film, in the area of the reservoir cover 92d, and then the flow cell is assembled. This arrangement is advantageous, because the reservoir has a very simple design, and therefore the flow cell can be inexpensively produced with reservoir elements for mass applications in which integration of a prefabricated reservoir element enclosed in the flow cell is unsuitable.

Figure 10:
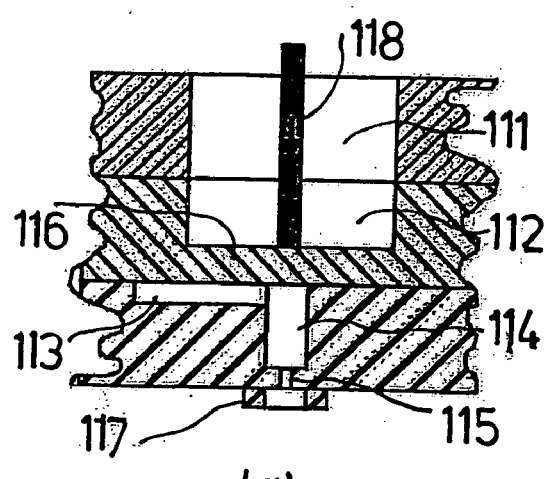
FIG. 10 shows various embodiments of dispensers in a flow cell of the invention.
Figure 10:
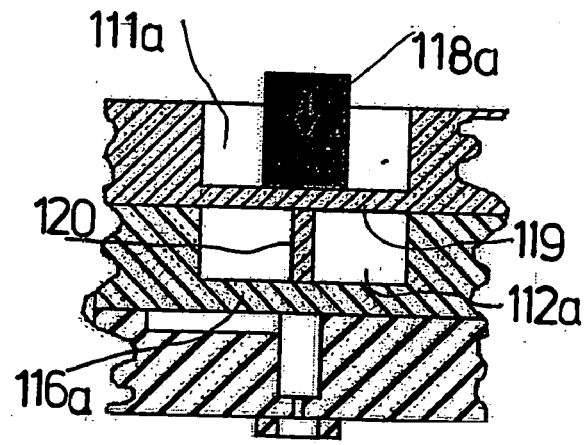
Figure 10:
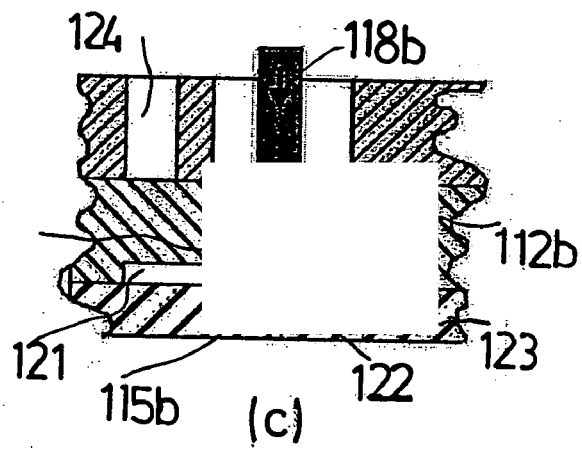
Figure 10:
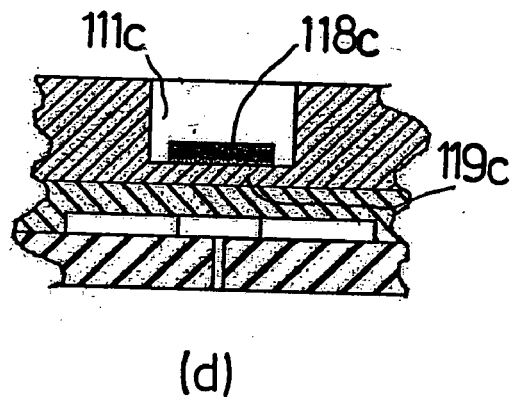

FIG. 10 shows several examples of the integration of a dispenser in a flow cell. Dispensers are used in the flow cell to dispense from the flow cell definite volumes of a liquid contained in the flow cell. Customary dispensed volumes are on the order of several hundred picoliters to a few microliters.

FIG. 10a shows a first embodiment with a recess 111, which extends all the way through the cover plate and into the intermediate plate, in which a cavity 112 is formed. Liquid is introduced into the dispenser through a microchannel 113. The microchannel 113 opens into a cavity 114 in the base plate. A capillary tube 115 extends through the remaining thickness of the base plate below the cavity 114. The upper end of the cavity 114 is sealed fluid-tight by an area 116 of the intermediate plate. This area 116 acts as a spring element. An annular wall 117, which annularly surrounds the outlet of the capillary tube 115, extends from the underside of the base plate. An external, plunger-like actuator 118, whose outside diameter is preferably smaller than the diameter of the cavity 114, is used to operate the dispenser. If the microchannel 113 and cavity 114 are filled with liquid, brief operation of the actuator on the order of milliseconds causes an advance of a few micrometers to a few hundred micrometers, which in turn reduces the volume in the cavity 114 and causes drops of liquid to be discharged from the capillary tube 115. Advantageously, the annular wall 117 can catch drops that do not emerge perpendicularly to the bottom surface and thus prevent unwanted contamination.

In the embodiment illustrated in FIG. 10b, a recess 111a does not pass completely through the cover plate. A base region 119 is left, which acts as a disk spring. A plunger 120 extends from the underside of the base region through a cavity 112a formed in the intermediate plate. The plunger could be joined as a single piece with the base region 119 or with a base region 116a of the cavity 111a. An external actuator 118a actuates the plunger 120 through the base region 119, which causes the discharge of drops in the manner described in connection with FIG. 10a. This embodiment is advantageous, because the requirements on the precision of the placement of the external actuator 118a and thus the arrangement of an external operating device are reduced by prepositioning of the plunger.

In the embodiment of FIG. 10c, only one capillary tube 115b, which is simple to produce, is formed in the base plate and passes through the entire thickness of the base plate. The intermediate plate has, in addition to a cavity 112b, an intake channel 121, a dispensing region 122, and a discharge channel 123. If liquid is being conveyed through the intake channel, then, if the base plate and/or the intermediate plate is transparent, a certain portion of a flowing liquid can be detected over a time t through a viewing window 124 in the cover plate or through the base plate. Detection can also be accomplished by a sensor that detects photons or by some other type of sensor. At a known flow rate and known dimensions of the intake channel, this portion reaches the dispensing region 122 after a time t+t1, where it can be discharged by means of an external actuator 118b. This does not require interruption of the fluid conveyance in the direction of the discharge channel 123. This type of embodiment allows the discharge of specific, previously determined portions of liquid or of microparticles, e.g., cells, present in the liquid.

The dispenser illustrated in FIG. 10d uses an integrated actuator 118c in the form of a piezoelectric disk, which is seated in a recess 111c on a base region 119c, which forms an actuator membrane. The piezoelectric disk, which is adhesively bonded with the base region 119c, causes the base region 119c to arch when a voltage of +400 volts is applied, so that drops of liquid are discharged. In this embodiment, the intermediate plate is thinner than in the preceding embodiment.

Figure 11:
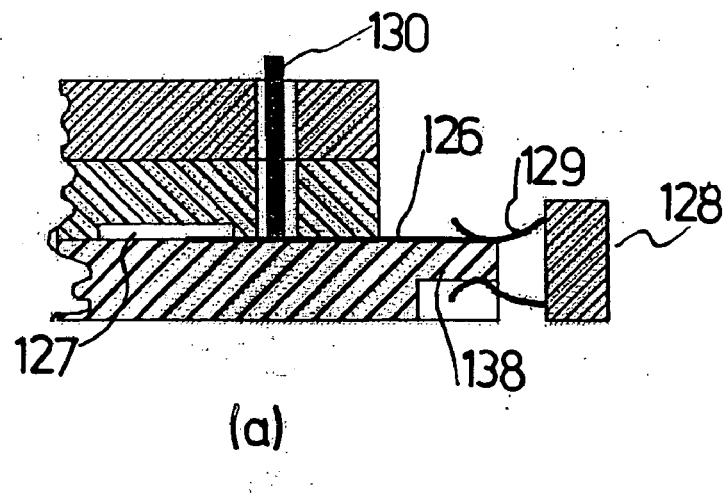
FIG. 11 shows various embodiments of electrical leads integrated in a flow cell of the invention.
Figure 11:
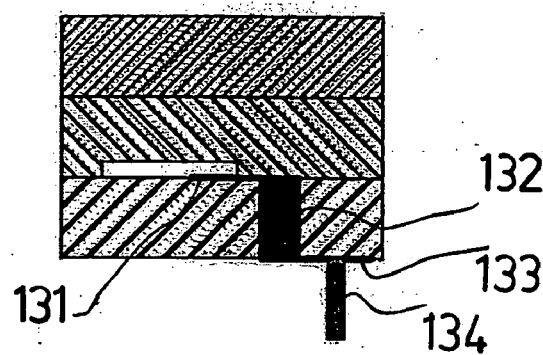
Figure 11:
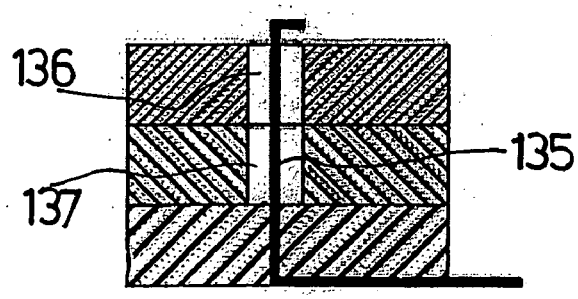

To allow flexible use of flow cells, it is necessary to have designs that integrate electrical functional elements and electrical tracks that can be contacted from the outside in a simple way. Thus, preferably electrodes are used as drives for the conveyance of liquids by electrophoresis, as sensor elements, or for contacting integrated, e.g., piezoelectric, actuators. FIG. 11 shows various embodiments.

An embodiment of the most preferred type is illustrated in FIG. 11a. The upper surface of the base plate has a metallic electrode 126, which extends partially into a microchannel 127, where it can come into contact with the liquid present in the microchannel. An electrode of this type can be produced inexpensively by thin-film techniques, e.g., sputtering, or by thick-film techniques, e.g., the screen resist method. Examples of suitable electrode materials are aluminum, gold, and platinum. Suitable materials for the base plate are plastics, ceramics, or circuit board materials. Electrical contact from the outside can be made by means of a plug connector 128 with spring contacts 129 in a region 138 of the base plate that protrudes from the edge of the flow cell. Alternatively, contact can be made by pins 130 that pass through recesses in the intermediate plate and cover plate. This embodiment is advantageous, because the electrodes can be applied to the surface of the plate by simple means, so that even complex electrode arrangements can be inexpensively produced.

FIG. 11b shows an embodiment with an electrode formed by an inner conductor 131, a plated-through-hole 132, and an outer conductor 133. The conductors are preferably produced by the screen resist method. The outer conductor is contacted by means of a pin 134, which is pressed against the freely accessible underside of the base plate. An advantage of this embodiment is that it requires only a short electrode length and thus small contact resistances. Electrodes and contacting are possible in high density, and contacting can be effected by contact pin arrays. The electrical contacting on the underside of the base plate is sufficiently spatially separated from the fluid-exposed contacting on the upper side of the base plate.

FIG. 11c shows an embodiment with an electrode 135 in the form of a stamped and/or bent part, which is anchored in the base plate by means of embedding technology. It is advantageous for the intermediate plate and the cover plate to have a recess 136 and 137, respectively, through which the electrode is passed in the form of a tongue. The upper side of the cover plate is thus provided with an electrical contact, which can be used for contacting integrated actuators or for otherwise necessary connections.

It is understood that the functional elements described above can be combined in any desired way and can be used in combination with different fluid networks consisting of microchannels, connecting holes, and chambers.

Since adhesive and welded joints are largely avoided, the assembly of the flow cell does not result in impairment of functionalized surfaces.

The invention claimed is:

1. Flow cell with a layered arrangement of three plates (3-5), in which an intermediate plate (4) made of a flexible material is held between plates (3, 5) made of a more rigid material, the intermediate plate (4) having at least one recess (16, 17) forming a chamber (17) and/or a connecting hole (16; 78, 79; 85, 87; 96; 102, 103) for holding fluid, wherein the plates (3-5) are connected with one another by connecting means (12, 13, 18) arranged some distance from the recess (15, 17) in the direction parallel to the plane of the plates in such a way that the intermediate plate (4) is compressed, wherein at least one of the plates (3, 5) of rigid material has at least one recess (10) open toward the intermediate plate (4) that forms a holding seat for a separately prefabricated microcomponent, wherein the recess (10) having a shoulder forming a through opening in the plate (3) or the recess (10) only being open on one side toward the intermediate plate (4), wherein the microcomponent (6) is held in the recess (10) by positive engagement and is bordered on a side facing away from the recess (10) by the recess (16, 17; 78, 79; 85, 87; 96; 102, 103).

2. Flow cell in accordance with claim 1, wherein the layered arrangement contains positioning elements (12, 13, 18) for mutual alignment of the plates, and that these positioning elements are arranged along the sides of the layered structure some distance from the recess.

3. Flow cell in accordance with claim 2, wherein the positioning elements and the connecting means (12, 13, 18) have common components.

4. Flow cell in accordance with claim 2, wherein the positioning elements and/or the connecting means consist of holes (13, 18) and pins (12).

5. Flow cell in accordance with claim 4, wherein the pins (12) are formed as integral parts of one (3) of the plates (3-5).

6. Flow cell in accordance with claim 4, wherein the diameter of the pins is smaller than the diameter of the holes.

7. Flow cell in accordance with claim 1, wherein the connecting means and/or positioning elements are arranged on opposite edges of the plates (3-5).

8. Flow cell in accordance with claim 1, wherein at least one of the plates made of a more rigid material has holes with a counterbore (40) for receiving the heads (29*b*) of the connecting pins (12*b*), which heads (29*b*) secure the plate from behind.

9. Flow cell in accordance with claim 1, wherein at least one of the plates (3-5) of the more rigid material, has the at least one recess (10) for holding a preferably separately prefabricated microcomponent (6, 58, 71, 89).

10. Flow cell in accordance with claim 9, wherein the recess is open both towards the intermediate plate (4) and towards the outside of the flow cell and preferably is undercut as seen from the outside.

11. Flow cell in accordance with claim 9, wherein the lateral dimensions of the microcomponent (6) positioned in the recess (10) are greater than the lateral dimensions of a recess (17) that is formed in the intermediate plate (4) and is bounded by the microcomponent (6).

12. Flow cell in accordance with claim 1, wherein the intermediate plate is compressed mainly in a region (140, 141) adjacent to the recess and/or connecting means (FIGS. 4*e* and 6*e*).

13. Flow cell in accordance with claim 1, wherein one of the plates has a recess (32*e*, 111, 112) with a base region (38, 116, 119) that is thinner than the plate, can be deformed, and/or can be pierced with a hollow needle (FIG. 5*f* and FIGS. 10*a* to 10*c*).

14. Flow cell in accordance with claim 1, wherein a connector (7-9) is formed as a single piece on at least one the plates (3, 5) made of the more rigid material.

15. Flow cell in accordance with claim 1, wherein a flow cell connector has a conical outer and/or inner surface (142, 143).

16. Flow cell in accordance with claim 1, wherein electrical conductors (126, 130-135) are integrated in the flow cell (FIG. 11).

17. Flow cell in accordance with claim 16, wherein a conductor (126, 131, 133) is formed as a coating on one of the plates.

18. Flow cell in accordance with claim 1, wherein a recess (27) formed on the outside of the flow cell for holding fluid is covered by a film (26) (FIG. 4*d*).

19. Flow cell in accordance with claim 1, wherein a single layered arrangement of plates (3-5) has several flow cell functional units (2).

20. Flow cell in accordance with claim 1, wherein a film (84, 109) for forming a valve or for covering a recess that is open towards the outside is formed between two plates of the layered arrangement (FIG. 8*e* and FIG. 9*d*).

* * * * *